(12) United States Patent
Kiko

(10) Patent No.: US 6,404,347 B1
(45) Date of Patent: Jun. 11, 2002

(54) ALARM FILTER CIRCUIT

(75) Inventor: Frederick J. Kiko, Carlsbad, CA (US)

(73) Assignee: Excelsus Technologies, Inc., Carlsbad, CA (US)

( * ) Notice: Subject to any disclaimer, the term of this patent is extended or adjusted under 35 U.S.C. 154(b) by 0 days.

(21) Appl. No.: 09/848,654

(22) Filed: May 4, 2001

(51) Int. Cl.[7] .............................................. G08B 21/00
(52) U.S. Cl. .................. 340/653; 340/652; 340/310.03; 379/30; 379/90.01; 379/93.08; 379/412
(58) Field of Search ................................ 340/653, 652, 340/286.01, 310.03; 379/37, 38, 39, 40, 47, 49, 45, 51, 93.05, 93.06, 93.07, 93.08, 90.01, 900, 387.01, 390.02, 399, 412; 455/445, 455

(56) References Cited

U.S. PATENT DOCUMENTS

| | | | | |
|---|---|---|---|---|
| 5,930,340 A | * | 7/1999 | Bell | 379/93.08 |
| 6,137,866 A | * | 10/2000 | Staber et al. | 379/93.06 |
| 6,141,377 A | * | 10/2000 | Sharper et al. | 379/93.05 |
| 6,144,735 A | * | 11/2000 | Bella | 379/93.05 |

* cited by examiner

*Primary Examiner*—Daniel J. Wu
*Assistant Examiner*—Davetta W. Goins
(74) *Attorney, Agent, or Firm*—Davis Chin

(57) ABSTRACT

An alarm filter circuit used in telecommunication systems for interconnecting between incoming telephone lines and alarm unit located at a subscriber=s premises so as to block DSL data signals to and from the alarm unit for preventing interference is provided. In one preferred embodiment, the alarm filter circuit includes a first inductor, a second inductor and a third capacitor functioning as a second-order low-pass filter section so as to block the DSL data signals to and from the alarm unit. Second and third capacitors functioning as a first-order high-pass filter section is provided so as to bypass the DSL data signals on the incoming telephone lines to the house wiring. A third inductor and a fourth inductor functioning as a first-order low-pass filter is provided so as to block high-frequency signals between the house wiring and the alarm unit. In a second embodiment, a fourth-order elliptical low-pass filter section replaces the second-order low-pass filter section. In a third embodiment, a third-order high-pass filter section replaces also the first-order high-pass filter section.

19 Claims, 3 Drawing Sheets

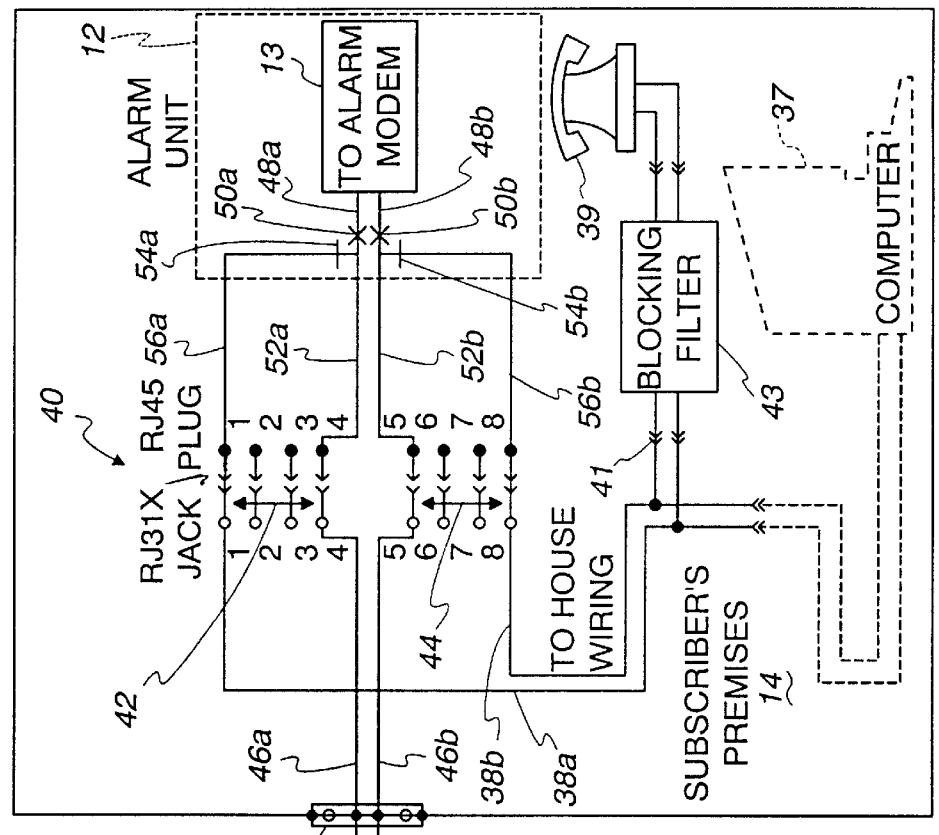
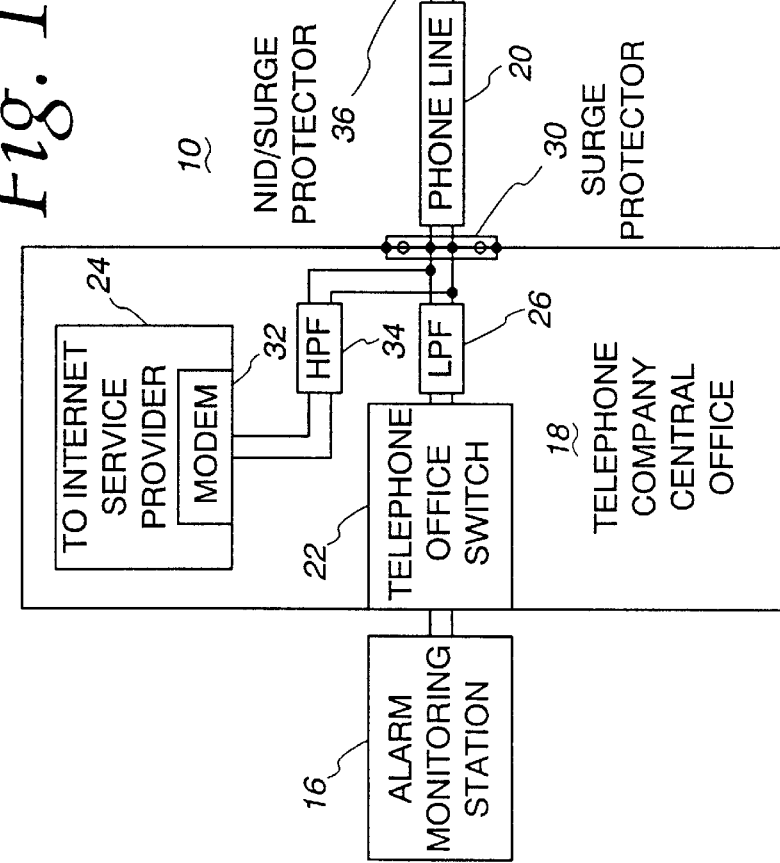
Fig. 1 - Prior art

ALARM FILTER CIRCUIT

BACKGROUND OF THE INVENTION

This invention relates generally to telecommunication systems and more particularly, it relates to an alarm filter circuit used in telecommunication systems for interconnecting between incoming telephone lines and an alarm unit located at a subscriber's premises so as to block DSL signals to and from the alarm unit for preventing interference.

It is generally well-know these days that many telephone subscribers or customers also have a personal computer located on their premises. At times, the computer user receives DSL (an acronym for Digital Subscriber Line) signals from the Internet over the same telephone lines via an Internet Service Provider (ISP). In addition, a number of telephone subscribers have an alarm system, such as burglar and/or fire, installed on their premises which is also connected to the same incoming telephone lines via internal house wiring. As a result, during an abnormal or alarm condition when the alarm modem is sending alarm signals to a monitoring station, the DSL signals will cause interference problems with the input circuitry of the alarm modem and will prevent the alarm signals from ever reaching the monitoring station. This problem is due to the input circuitry of the alarm modem not having sufficient low pass filtering above the frequency of 4 KHz since the upstream DSL signals will be at a relatively high level (several volts) beginning at the frequency of 25 KHz or above. Thus, the DSL signals will saturate the input circuitry of the alarm modem. Further, the interference problem will also produce distortion elements which will effectively reduce or limit the DSL data rates.

Accordingly, it would be desirable to provide an alarm filter circuit so as to prevent DSL signals from interfering with an alarm unit located at the subscriber=s premises and vice versa. It would be expedient that the alarm filter circuit be capable of a self-installed approach so as to allow the subscriber or customer to perform his own connection, thereby avoiding the time and cost for a trained technician to be sent to a subscriber=s premises to perform the installation. The alarm filter circuit of the present invention is of a modular type adapter designed so as to facilitate quick and easy connections between the incoming telephone lines and the alarm unit. The alarm filter circuit serves to block the DSL signals in the frequency band of 25 KHz to 1.1 MHz from reaching the alarm unit.

SUMMARY OF THE INVENTION

Accordingly, it is a general object of the present invention to provide an alarm filter circuit which effectively and efficiently prevents DSL signals from interfering with an alarm unit located at a subscriber's premises.

It is an object of the present invention to provide an alarm filter circuit used in telecommunication systems for interconnecting between incoming telephone lines and an alarm unit located at a subscriber=s premises.

It is another object of the present invention to provide an alarm filter circuit used in telecommunication systems for interconnecting between incoming telephone lines and an alarm unit located at a subscriber=s premises so as to block DSL signals from interfering with the alarm unit and vice versa.

It is still another object of the present invention to provide an alarm filter circuit which is of a modular type adapter designed so as to facilitate quick and easy connections between incoming telephone lines and an alarm unit.

It is still yet another object of the present invention to provide an alarm filter circuit which includes a low-pass filter section interconnected between incoming telephone lines and an alarm unit for preventing overloading of the alarm unit and a high-pass filter section for bypassing DSL data signals from the incoming telephone lines to the house wiring and around the low-pass filter section.

It is yet still another object of the present invention to provide an alarm filter circuit which includes a second-order or fourth-order elliptical low pass filter section and a first-order or third-order high-pass filter section.

In accordance with one preferred embodiment of the present invention, there is provided an alarm filter circuit used in telecommunication systems for interconnecting between incoming telephone lines and an alarm unit located at a subscriber's premises so as to block DSL data signals to and from the alarm unit for preventing interference. The alarm filter circuit includes a second-order low-pass filter section formed of a first inductor, a second inductor, and a first capacitor; a first-order high-pass filter section formed of a second capacitor and a third capacitor; and a first-order low-pass filter section formed of a third inductor and a fourth inductor.

In a second embodiment of the present invention, the alarm filter circuit includes a fourth-order elliptical low-pass filter section formed of first through fourth inductors and first through fourth capacitors; a first-order high-pass filter section formed of a fifth capacitor and a sixth capacitor; and a first-order low-pass filter section formed of a fifth inductor and a sixth inductor. In a third embodiment of the present invention, the alarm filter circuit includes a fourth-order elliptical low-pass filter section formed of first through fourth inductors and first through fourth capacitors; a third-order high-pass filter section formed of a fifth through eighth capacitors and a fifth inductor; and a first-order low-pass filter section formed of a sixth inductor and a seventh inductor.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a simplified block diagram of a conventional telecommunication system for interconnecting an alarm unit located at a subscriber's premises to a monitoring station connected to a central office of a telephone company;

DESCRIPTION OF THE PREFERRED EMBODIMENT

Figure 2:
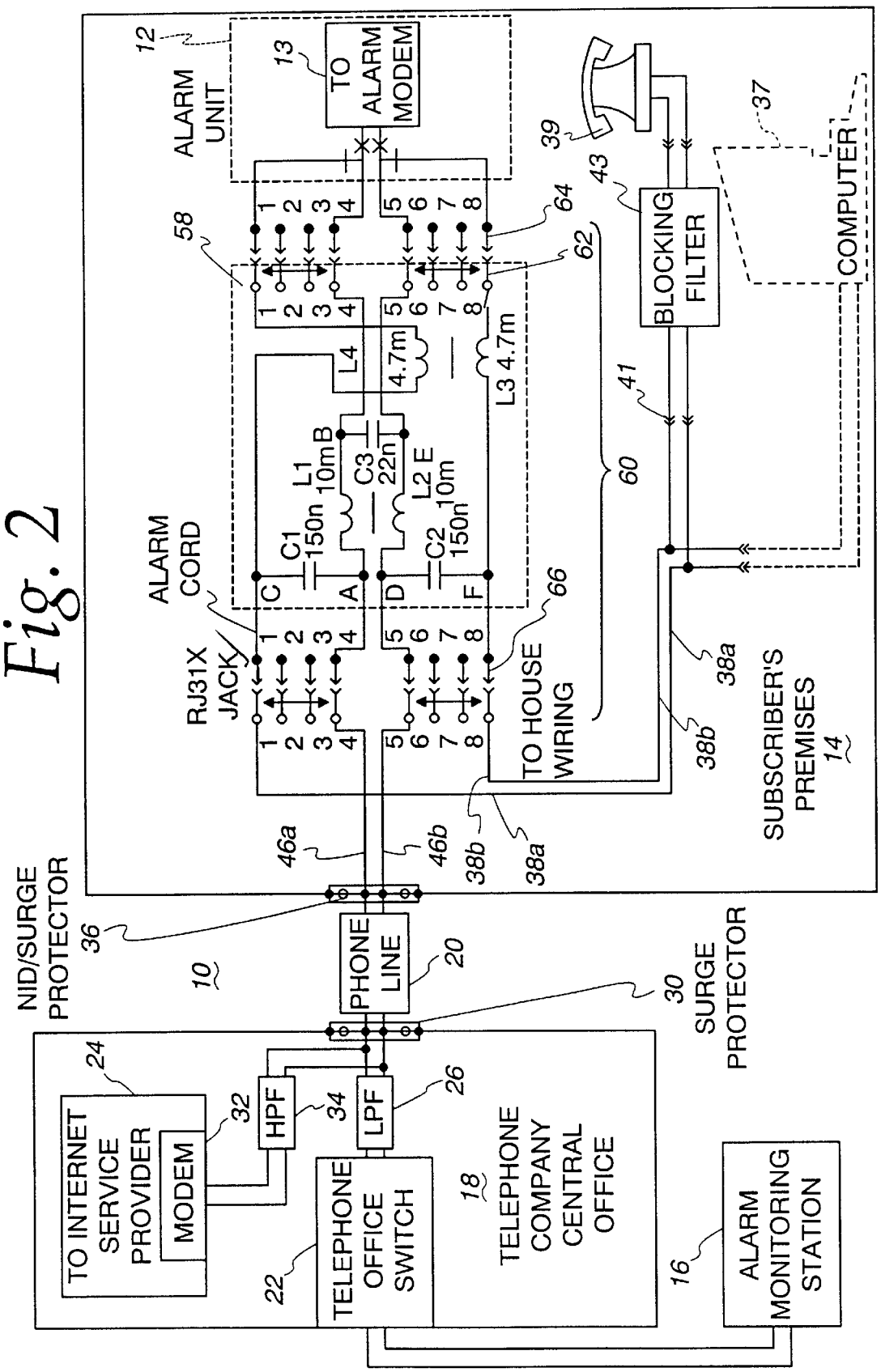
FIG. 2 is a detailed schematic circuit diagram of an alarm filter circuit of the present invention housed in a modular type adapter for interconnection between the incoming telephone lines and the alarm unit in FIG. 1, constructed in accordance with the principles of the present invention.

Referring now in detail to the drawings, there is illustrated in FIG. 1 a simplified block diagram of a conventional telecommunication system 10 for interconnecting between an alarm unit 12 located at a subscriber=s or customer's premises 14 and an alarm monitoring station 16 connected to a telephone company's central office 18 via a transmission media such as a conventional twisted pair of telephone lines 20. The central office 18 includes a telephone office switch 22 and an Internet Service Provider (ISP) 24. The telephone office switch 22 is used to send voice signals via low-pass filter 26 and a surge protector 30 to the telephone lines 20. The ISP 24 transmits DSL data signals to a modem 32 which are then sent to the telephone lines 20 via a high-pass filter 34 and the surge protector 30.

It should be noted that the voice signals from the telephone office switch 22 and the DSL data signals from the ISP 24 can be transmitted simultaneously to the telephone lines 20. Further, the voice signals (speech) are in the frequency band between 300 Hz and 3400 Hz, and the DSL data signals are in the frequency band between 25 KHz and 2 MHz.

The subscriber's premises 14 includes a Network Interface Device (NID)/surge protector unit 36 which is connected to the incoming telephone lines 20 on its input side and is connected to the subscriber's internal wiring or house wiring 38a, 38b on its output side for a normal alarm installation via a special FCC specified connector 40. The connector 40 is a RJ31X jack and RJ45 plug unit which is installed between the NID/surge protector unit 36 and the house wiring 38a, 38b. The connector 40 allows the incoming telephone lines 20 to be disconnected from the house wiring 38a, 38b and to be connected directly instead to the alarm unit 12 so that the alarm modem 13 thereof can dial up the alarm monitoring station 16.

As can be seen, when there is no alarm unit 12 connected at the subscriber=s premises the RJ45 plug of the connector 40 is disconnected from the RJ31X jack. As a result, the bridging or shorting bar 42 will cause terminal pins 1 and 4 to be shorted together, and the bridging bar 44 will cause terminal pins 5 and 8 to be shorted together. Thus, the line wire 46a (coming from the NID) connected also to the terminal pin 4 will be joined to the house wiring 38a connected also to the terminal pin 1. Similarly, the line wire 46b (coming from the NID) connected also to the terminal pin 5 will be joined to the house wiring 38b connected also to the terminal pin 8.

On the other hand, when the alarm unit 12 connected to the RJ45 plug is plugged into the RJ31X jack the bridging bars 42, 44 will cause the terminal pins 1, 4 and 5, 8 to become disconnected respectively, thereby allowing both the line wire 46a, 46b and the house wiring 38a, 38b to be connected directly to the alarm unit 12.

The alarm unit 12 includes the alarm modem 13 having leads 48a, 48b connected to one side of a pair of normally-open relay contacts 50a, 50b respectively. The other side of the normally-open contacts 50a, 50b are joined to the respective RJ45 plug terminal pins 4, 5 via lines 52a, 52b. Further, the other side of the normally-open relay contact 50a is also joined to one side of a normally-closed relay contact 54a, and the other side of the normally-open relay contact 50b is also connected to one side of a normally-closed relay contact 54b. The other side of the normally-closed contact 54a is joined to the RJ45 plug terminal pin 1 via line 56a, and the other side of the normally-closed contact 54b is joined to the RJ45 plug terminal pin 8 via line 56b.

In normal operation, the alarm unit 12 will be in an idle state and all of the relay contacts 50a, 50b, and 54a, 54b will be in the positions as shown. In this normal condition, the line wire 46a will be joined to the house wiring 38a via line 52a, normally-closed contact 54a, line 56a and pin 1 of the connector 40. Likewise, the line wire 46b will be joined to the house wiring 38b via line 52b, normally-closed contact 54b, line 56b and pin 8 of the connector 40. This is identical to the connection when no alarm unit 12 is plugged into the RJ31X jack of the connector 40.

In an abnormal situation (an alarm condition), the alarm unit 12 will be activated so as to cause the normally-open contacts 48a, 48b to close and the normally-closed contacts 54a, 54b to open. As a consequence, the line wires 46a, 46b will be disconnected from the house wiring 38a, 38b and will be connected directly instead to the alarm modem 13 which can then dial up the alarm monitoring station 16.

Unfortunately, when a personal computer 37 connected to the house wiring 38a, 38b is downloading information from the ISP 24, the DSL data signals are being transmitted over the same line wires 46a, 46b which will cause interference problems (overload and/or distortion) with the alarm modem 13 of the alarm unit 12 attempting to call the alarm monitoring station 16. Further, a plurality of telephone sets 39 (one of which is shown) are also connected to the same house wiring 38a, 38b via a RJ-11 unit 41 and an impedance blocking filter 43 for preventing DSL interference problems caused by the telephone terminal equipment (i.e., the telephone sets 39). In view of this, the inventor of the present invention has developed an alarm filter circuit 58 which can be interconnected between the connector 40 and the alarm unit 12 so as to block the DSL data signals from the ISP 24 from being received by the input circuitry of the alarm modem 13 in order to prevent interference problems. Moreover, in order to facilitate self-installation by a telephone subscriber or customer without having a trained technician visit the premises and perform the installation, the alarm filter circuit 58 is arranged in a modular type adapter design.

In FIG. 2, there is shown a detailed schematic circuit diagram of the alarm filter circuit 58 housed in a modular type adapter 60 for interconnection between the incoming telephone line wires 46a, 46b and the alarm unit 12. One end of the modular type adapter 60 has a RJ31X jack 62 formed integrally therewith for connection to the alarm unit 12. This connection is achieved by plugging a RJ-45 plug 64 from the alarm unit 12 into the jack 62. The other end of the modular type adapter 60 has a RJ-45 plug 66 formed integrally therewith which is connectible to both the incoming telephone line wiring 46a, 46b and the house wiring 38a, 38b. In particular, the RJ-45 plug 66 is connected to the incoming line wiring and the house wiring by plugging the same into the RJ31X jack of the connector 40.

The alarm filter circuit 58 is connected to input tip and ring terminal pins 4, 5 (inner pair) of the RJ-45 plug 66 which are joined to the incoming line wires 46a, 46b via the RJ31X jack of the connector 40. The alarm filter circuit is also connected to the input tip and ring terminal pins 1, 8 (outer pair) of the RJ-45 plug 66 which are joined to the house wiring 38a, 38b via the same RJ31X jack. The alarm filter circuit is further connected to the output tip and ring terminal pins 4,5 of the RJ31X jack 62 which are connected to the alarm modem 13 of the alarm unit 12 via the RJ-45 plug 64. The alarm filter circuit is further connected to the output tip and ring pins 1,8 of the RJ31X jack 62 which are connected to the house wiring 38a, 38b via the same plug 64. The alarm filter circuit is comprised of inductors L1 through L4 and capacitors C1 through C3.

One end of the inductor L1 is connected to the input tip terminal pin 4 and to one end of the capacitor C1 at a node A. The other end of the inductor L1 is connected to the output tip terminal pin 4 and to one end of the capacitor C3 at node B. The other end of the capacitor C1 is connected to the terminal pin 1 and to one end of the inductor L4 at a node C. The other end of the inductor L4 is connected to the output tip terminal pin 1.

Similarly, one end of the inductor L2 is connected to the input ring terminal pin 5 and to one end of the capacitor C2 at a node D. The other end of the inductor L2 is connected to the output ring terminal pin 5 and to the other end of the capacitor C3 at node E. The other end of the capacitor C2 is connected to the pin 8 and to one end of the inductor L3 at node F. The other end of the inductor L3 is connected to the output ring terminal pin 8.

The inductors L1 and L2 have the same inductance value, and the inductors L3 and L4 have the same inductance values. Each of the inductors is preferably formed by a separate winding so as to avoid longitudinal impedance problems due to RF interferences (i.e., AM broadcast or Ham radio transmission). However, it should be understood by those skilled in the art that the individual inductors L1, L2 (L3, L4) could be replaced by a dual winding inductor.

The inductors L1, L2 and the capacitor C3 is basically a second-order low-pass filter section which blocks the DSL data signals being in the frequency band of 25 KHz–1.1 MHz to and from the input circuitry of the alarm modem 13, thereby preventing any interference problems during an alarm condition. These DSL data signals are sent or bypassed to the house wiring 38a, 38b connected to the personal computer 37 by way of the respective capacitors C1, C2 defining a first-order high-pass filter section. Further, the inductors L3, L4 form a first-order low-pass filter section which serves to filter high frequency signals generated between the house wiring 38a, 38b and the alarm modem 13. The values of the inductors and capacitors are selected so as to provide the desired flatness in the frequency bands of the alarm modem (400 Hz to 4 KHz) and the ADSL signals (25 KHz to 1.1 MHz)for both the idle state and the alarm condition.

For completeness in disclosure of the above-identified alarm filter circuit but not for purposes of limitation, the following representative values and component identifications are submitted. These values and components were employed in an alarm filter circuit that was constructed and tested, and which provides high quality performance.

| PART | TYPE OR VALUE |
| --- | --- |
| L1, L2 | 10 mH |
| L3, L4 | 4.7 mH |
| C1, C2 | 150 nf |
| C3 | 22 nf |

From the foregoing detailed description, it can thus be seen that the present invention provides an alarm filter circuit used in telecommunication systems for interconnecting between incoming telephone lines and an alarm unit located at a subscriber's premises so as to block DSL data signals to and from the alarm unit for preventing interference. In one preferred embodiment, the alarm filter circuit includes a first inductor, a second inductor and a third capacitor functioning as a second-order low-pass filter section so as to block the DSL data signals to and from the alarm unit. Second and third capacitors functioning as a first-order high-pass filter section is provided so as to bypass the DSL data signals on the incoming telephone lines to the house wiring. A third inductor and a fourth inductor functioning as a first-order low-pass filter is provided so as to block high-frequency signals between the house wiring and the alarm unit.

Figure 3:
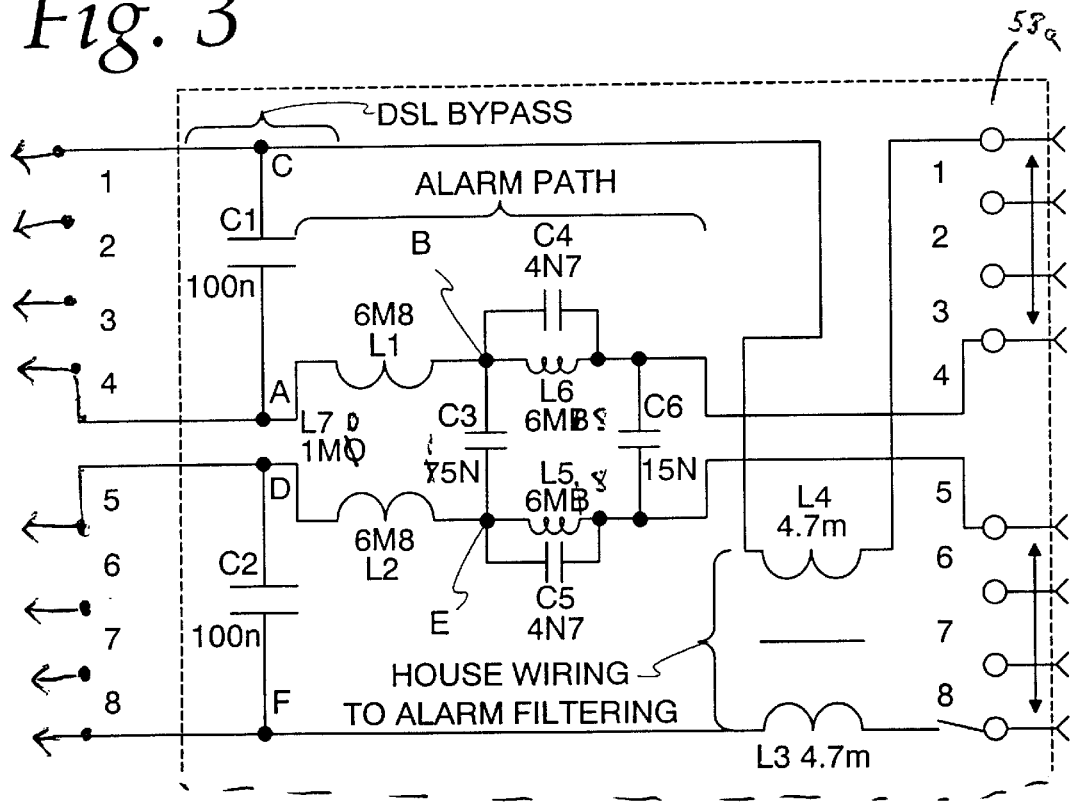
FIG. 3 is schematic circuit diagram of a second embodiment of an alarm filter circuit in accordance with the present invention.

While the alarm filter circuit 58 of FIG. 2 performed adequately, the inventor has found based upon testing of certain alarm signals that a higher attenuation at frequencies above 25 KHz was required for the second-order low-pass filter section (L1, L2, C3) Thus, there is shown in FIG. 3 a schematic circuit diagram of a second embodiment of an alarm filter circuit 58a of the present invention having a fourth-order elliptical low-pass filter section. The alarm filter circuit 58a having the fourth-order elliptical low-pass filter section of FIG. 3 is substantially identical to the alarm filter circuit 58 having the second-order low-pass filter section of FIG. 2, except there has been added inductors L5, L6 and capacitors C4–C6.

Specifically, the inductor L6 and the capacitor C4 connected in parallel are joined between the node B and the output tip terminal pin 4. The inductor L5 and the capacitor C5 connected in parallel are joined between the node E and the output ring terminal pin 5. The capacitor C6 has it one end connected also to the terminal pin 4 and its other end connected also to the terminal pin 5. During the alarm condition, the fourth-order elliptical low-pass filter section will block the DSL data signals to and from the input circuitry of the alarm modem. Further, in the idle state the fourth-order elliptical low-pass filter section will be connected in series with the first-order low-pass filter section (L3, L4) so as to effectively bypass signals in the DC to 4 KHz range to and from the incoming lines and the house wiring.

Figure 4:
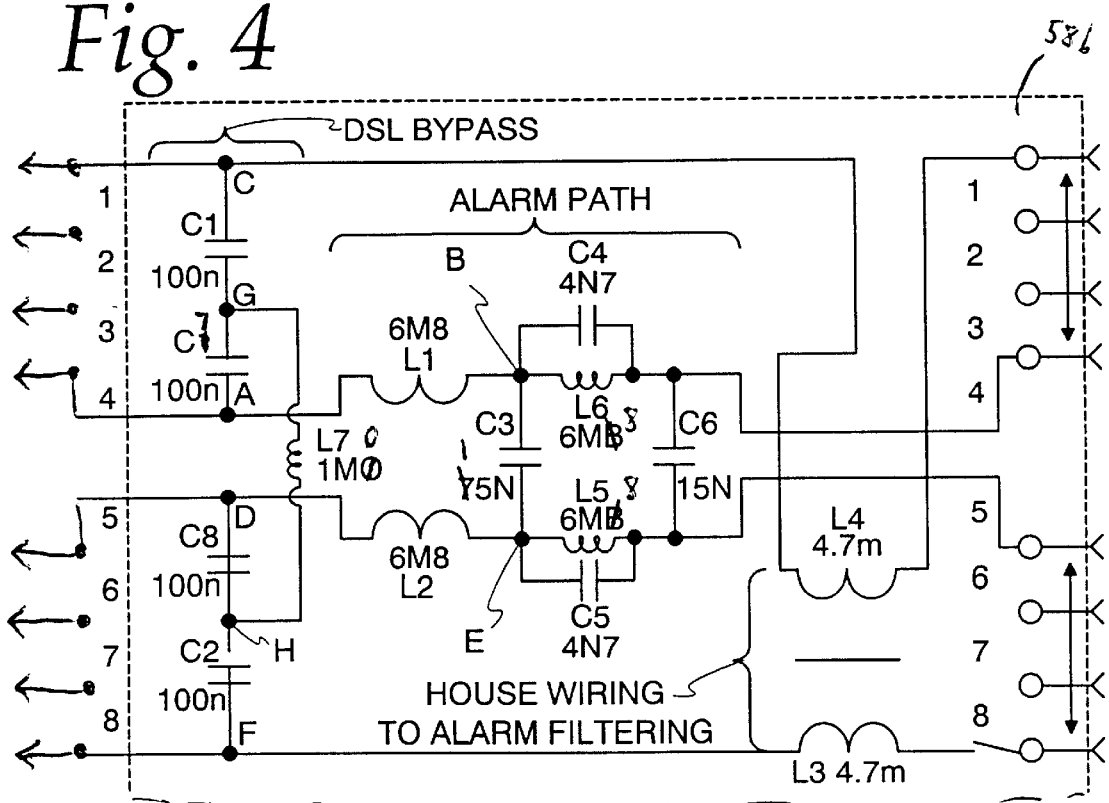
FIG. 4 is schematic circuit diagram of a third embodiment of an alarm filter circuit in accordance with the present invention.

In order to provide a flatter response in the frequency range of 25 KHz to 100 KHz for both the idle state and the alarm condition than the first-order high-pass filter section (C1, C2) of FIG. 3, the inventor has developed a third-order high-pass filter section for bypassing the DSL data signals above 25 KHz to and from the alarm modem. Therefore, there is shown in FIG. 4 a schematic circuit diagram of a third embodiment of an alarm filter circuit 58b of the present invention having a third-order high-pass filter section. The alarm filter circuit 58b having the third-order high-pass filter section of FIG. 4 is substantially identical to the alarm filter circuit 58a of FIG. 3, except there has been added an inductor L7 and capacitors C7,C8.

In particular, the capacitor C7 has its one end connected to one end of the capacitor C1 at a node G and its other end connected to the node A. The capacitor C8 has its one end connected to one end of the capacitor C2 at a node H and its other end connected to the node D. One end of the inductor L7 is also connected to the node G, and the other end of the inductor L7 is connected also to the node H.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An alarm filter circuit used in telecommunication systems for interconnecting between incoming telephone lines and an alarm unit located at a subscriber's premises so as to block DSL data signals to and from the alarm unit for preventing interference, said alarm filter circuit comprising:

a second-order low-pass filter section formed of a first inductor, a second inductor, and a first capacitor;

the first inductor having a first end and a second end;

the second inductor having a first end and a second end;

the first capacitor having a first end connected to said first end of said first inductor and to a first output terminal pin and having a second end connected to said first end of said second inductor and to a second output terminal pin;

a first-order high-pass filter section formed of second capacitor and a third capacitor;

the second capacitor having a first end connected to said second end of said first inductor and to a first input terminal pin and having a second end connected to a second input terminal pin;

the third capacitor having its first end connected to said second end of said second inductor and to a third input terminal pin and having its second end connected to a fourth output terminal pin;

a first-order low-pass filter section formed of third inductor and a fourth inductor;

the third inductor having a first end connected also to said second end of said second capacitor and having a second end connected to a third output terminal pin; and the fourth inductor having a first end connected also to said second end of said third capacitor and having a second end connected to a fourth output terminal pin.

2. An alarm filter circuit as claimed in claim 1, wherein said first inductor, second inductor and first capacitor function as the second-order low-pass filter section so as to block the DSL data signals to and from said alarm unit.

3. An alarm filter circuit as claimed in claim 2, wherein said first and second inductors have values on the order of 10 mH.

4. An alarm filter circuit as claimed in claim 3, wherein said third capacitor has a value on the order of 22 nf.

5. An alarm filter circuit as claimed in claim 4, wherein said third and fourth inductors function as the first-order low-pass filter section so as to block high-frequency signals to and from house wiring and said alarm unit.

6. An alarm filter circuit as claimed in claim 5, wherein said third and fourth inductors have values on the order of 4.7 mH.

7. An alarm filter circuit as claimed in claim 6, wherein said second and third capacitors function as the first-order high-pass filter section so as to bypass the DSL signals on the incoming telephone lines to the house wiring.

8. An alarm filter circuit as claimed in claim 7, wherein said second and third capacitors have values on the order of 150 nf.

9. An alarm filter circuit as claimed in claim 1, wherein said first through fourth inductors and first through third capacitors are housed in a modular type adaptor design having plug means on its one end for connection to the incoming telephone lines and having jack means on its other end for connection to said alarm unit.

10. An alarm filter circuit as claimed in claim 9, wherein said plug means is a RJ-45 plug.

11. An alarm filter circuit as claimed in claim 10 wherein said jack means is a RJ31X jack.

12. An alarm filter circuit as claimed in claim 11, wherein said adapter design is capable of self-installation by a subscriber or customer.

13. An alarm filter circuit used in telecommunication systems for interconnecting between incoming telephone lines and an alarm unit located at a subscriber's premises so as to block DSL data signals to and from the alarm unit for preventing interference, said alarm filter circuit comprising:

a fourth-order elliptical low-pass filter section formed of first through fourth inductors and first through fourth capacitors;

the first inductor having a first end and a second end;

the second inductor having a first end and a second end;

the first capacitor having a first end connected to said first end of said first inductor and having a second end connected to said first end of said second inductor;

said third inductor and said second capacitor being connected in parallel and having its one end joined also to said first end of said first inductor and its other end joined to one end of said third capacitor and a first output terminal pin;

said fourth inductor and fourth capacitor being connected in parallel and having its one end joined also to said first end of said second inductor and its other end joined to the other end of said fourth capacitor and a second output terminal pin;

a first-order high-pass filter section formed of fifth capacitor and a sixth capacitor;

the fifth capacitor having a first end connected to said second end of said first inductor and to a first input terminal pin and having a second end connected to a second input terminal pin;

the sixth capacitor having its first end connected to said second end of said second inductor and to a third input terminal pin and having its second end connected to a fourth output terminal pin;

a first-order low-pass filter section formed of fifth inductor and a sixth inductor;

the fifth inductor having a first end connected also to said second end of said fifth capacitor and having a second end connected to a third output terminal pin; and the sixth inductor having a first end connected also to said second end of said sixth capacitor and having a second end connected to a fourth output terminal pin.

14. An alarm filter circuit as claimed in claim 13, wherein said first through fourth inductors and first through fourth capacitors function as the fourth-order elliptical low-pass filter section so as to block the DSL data signals to and from said alarm unit with a flatter response for frequencies between 25 KHz–100 KHz.

15. An alarm filter circuit as claimed in claim 13, further comprising a seventh capacitor interconnected between the first end of said fifth capacitor and said first input terminal pin, an eighth capacitor interconnected between the first end of said sixth capacitor and said second input terminal pin, and a seventh inductor having its one end connected also to the first end of said fifth capacitor and having its other end connected also to the first end of said sixth capacitor so as to define a third-order high-pass filter section.

16. An alarm filter circuit as claimed in claim 13, wherein said first through sixth inductors and first through sixth capacitors are housed in a modular type adaptor design having plug means on its one end for connection to the incoming telephone lines and having jack means on its other end for connection to said alarm unit.

17. An alarm filter circuit as claimed in claim 16, wherein said plug means is a RJ-45 plug.

18. An alarm filter circuit as claimed in claim 17, wherein said jack means is a RJ31X jack.

19. An alarm filter circuit as claimed in claim 18, wherein said adapter design is capable of self-installation by a subscriber or customer.

* * * * *